United States Patent
Katsuragawa et al.

(10) Patent No.: US 8,108,215 B2
(45) Date of Patent: Jan. 31, 2012

(54) SPEECH RECOGNITION APPARATUS AND METHOD

(75) Inventors: Keiko Katsuragawa, Kawasaki (JP); Minoru Tomikashi, Yokohama (JP); Takeshi Ono, Yokosuka (JP); Daisuke Saitoh, Yokosuka (JP); Eiji Tozuka, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1135 days.

(21) Appl. No.: 11/876,348

(22) Filed: Oct. 22, 2007

(65) Prior Publication Data

US 2008/0262843 A1    Oct. 23, 2008

(30) Foreign Application Priority Data

Nov. 29, 2006   (JP) .................................. 2006-321295

(51) Int. Cl.
*G10L 15/04*   (2006.01)

(52) U.S. Cl. ........ 704/253; 704/246; 704/247; 704/251; 704/252

(58) Field of Classification Search .................. None
See application file for complete search history.

(56) References Cited

U.S. PATENT DOCUMENTS

| 6,556,970 | B1 | 4/2003 | Sasaki et al. | |
|---|---|---|---|---|
| 2006/0106604 | A1* | 5/2006 | Okimoto | 704/243 |
| 2007/0073540 | A1* | 3/2007 | Hirakawa et al. | 704/252 |

FOREIGN PATENT DOCUMENTS

| JP | 63163496 A | 7/1988 |
|---|---|---|
| JP | 6118990 A | 4/1994 |
| JP | 6301399 A | 10/1994 |
| JP | 11149294 A | 6/1999 |
| JP | 2000148181 A | 5/2000 |
| JP | 2000187497 A | 7/2000 |
| JP | 2001-034292 A | 2/2001 |
| JP | 2001-306088 A | 11/2001 |
| JP | 2002023783 A | 1/2002 |
| JP | 2004133880 A | 4/2004 |
| JP | 2005043461 A | 2/2005 |
| JP | 2005338274 A | 12/2005 |
| JP | 2006184670 A | 7/2006 |

* cited by examiner

*Primary Examiner* — Leonard Saint Cyr
(74) *Attorney, Agent, or Firm* — Young Basile (57) ABSTRACT

An apparatus and method for recognizing paraphrases of uttered phrases, such as place names. At least one keyword contained in a speech utterance is recognized. Then, the keyword(s) contained in the speech utterance are re-recognized using a phrase including the keyword(s). Based on both recognition results, it is determined whether a paraphrase could have been uttered. If a paraphrase could have been uttered, a phrase corresponding to the paraphrase is determined as a result of speech recognition of the speech utterance.

16 Claims, 5 Drawing Sheets

FIG. 1

FIG. 2

SPEECH RECOGNITION APPARATUS AND METHOD

CROSS-REFERENCE TO RELATED APPLICATION

This application claims priority from Japanese Patent Application Serial No. 2006-321295, filed Nov. 29, 2006, which is incorporated herein in its entirety by reference.

TECHNICAL FIELD

The invention relates to a speech recognition apparatus and method for recognizing speech utterances.

BACKGROUND

An apparatus for speech recognition is known from, for example, Japanese Unexamined Patent Application Publication No. 2001-306088. In that publication, the speech recognition apparatus is configured to recognize place names input as speech using dictionary data prepared for each prefectur.

BRIEF SUMMARY

A speech recognition apparatus and method able to recognize an utterance even if the utterance is a paraphrase of a phrase contained in a speech recognition dictionary. According one embodiment of the invention, a speech input unit is configured to input a speech utterance. A first recognition unit analyses the utterance in an attempt to recognize any keywords. A second recognition unit then re-recognizes any uttered keywords to determine whether there are any phrases containing the keyword(s). A paraphrase determination unit compares the results obtained by the first and second recognizing units to determine whether a paraphrase could have been uttered. If the paraphrase determination unit determines that a paraphrase has been uttered, a recognition-result determination unit returns a phrase corresponding to the paraphrase based on the at least one keyword recognized by the first recognition unit.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In known speech recognition processes designed to recognize place names input as speech using dictionary data previously prepared, the place name cannot be recognized if the speaker utters a paraphrase of a place name that is different from the place name registered in the dictionary data. In contrast, and according to embodiments of the invention, even if a user utters a paraphrase of a place name different from the place name registered in dictionary data, the place name can be correctly recognized.

Figure 1:
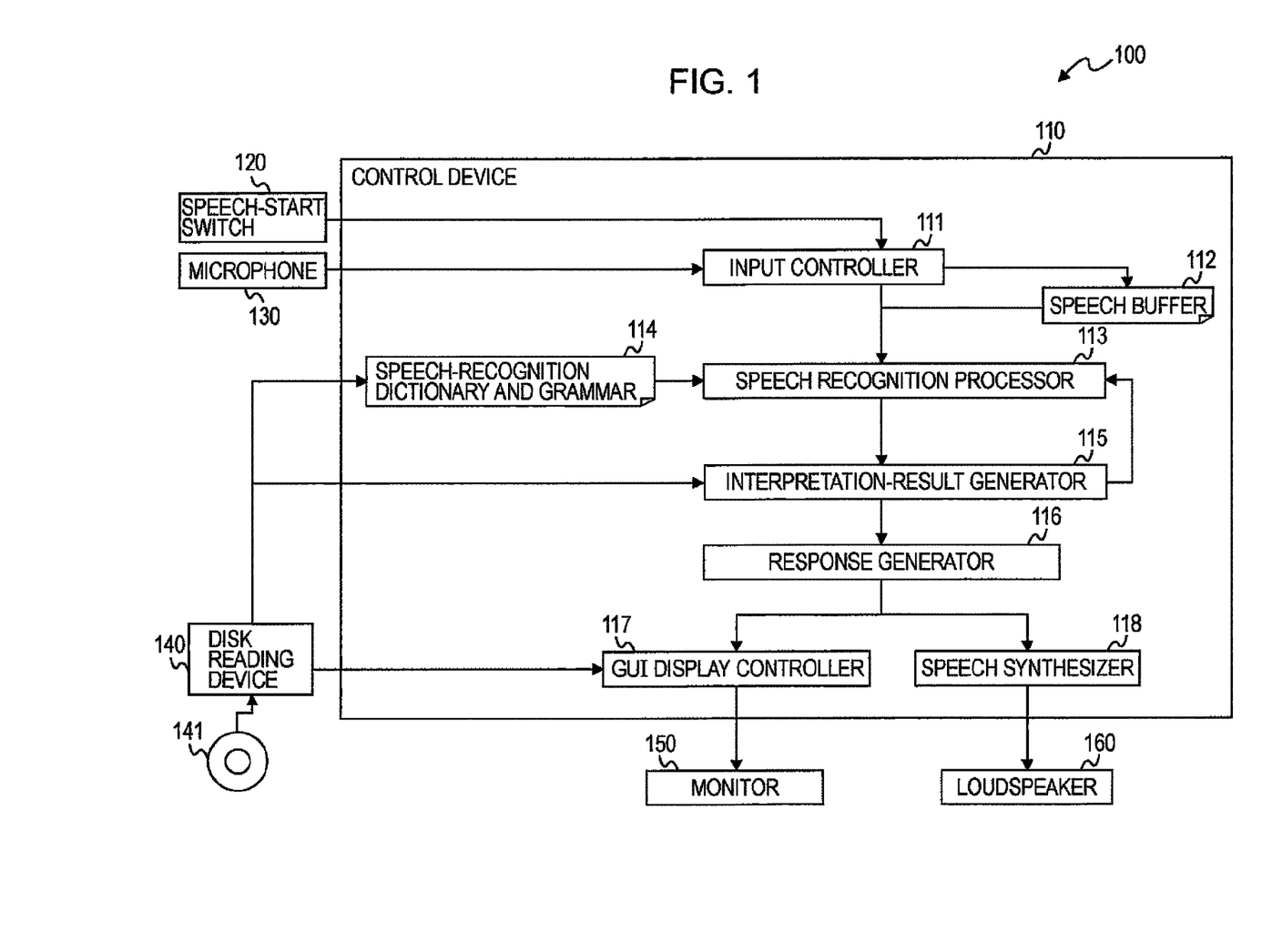
FIG. 1 is a block diagram showing the structure of a speech recognition apparatus according to an embodiment of the invention.

FIG. 1 is a block diagram showing the structure of a speech recognition apparatus 100 according to an embodiment of the invention. The speech recognition apparatus 100 is mounted with, for example, an on-vehicle navigation system. A user can input speech according to a response message output from the speech recognition apparatus 100 to operate the navigation system.

The speech recognition apparatus 100 includes a speech-start switch 120 operated by the user to issue an instruction to start speech recognition; a microphone 130 configured to input speech uttered by the user; a control device 110 configured to recognize speech data input through the microphone 130 and to return a response to the user according to the content of the speech data; a disk reading device 140 configured to read a disk 141 storing map data, guidance speech data, and speech-recognition dictionary and grammar for use in speech recognition; a monitor 150 configured to display a map or menu screen output from the navigation system and a speech recognition result output from the speech recognition apparatus 100; and a loudspeaker 160 configured to output speech.

The control device 110 is composed of a central processing unit (CPU), memory and other peripheral circuits. The control device 110 can be, for example, a microcomputer including a random access memory (RAM), a read-only memory (ROM) and a CPU in addition to various input and output connections. Generally the functions described herein for the control device 110 are performed by execution by the CPU of one or more programs stored in ROM. The parts of the control device 110 shown in the figures and described below represent functional components of the one or more programs. Of course, some or all of the functions described can also be implemented in whole or in part by hardware.

The control device 110 includes an input controller 111, a speech buffer 112, a speech recognition processor 113, a speech-recognition dictionary and grammar 114, an interpretation-result generator 115, a response generator 116, a graphical user interface (GUI) display controller 117 and a speech synthesizer 118.

When the user operates the speech-start switch 120 and enters a speech-recognition start command, the input controller 111 receives the entered command and instructs the speech recognition processor 113 to start the capture of speech. When the capture of speech from the microphone 130 is started, the captured speech data is stored in the speech buffer 112.

Further, the speech recognition processor 113 performs speech recognition of the captured speech data using the speech-recognition dictionary and grammar 114.

The speech-recognition dictionary and grammar 114 represents a portion of a memory for recording standby words for use in speech recognition, which words are recorded in the disk 141.

In the speech recognition apparatus 100 according to this embodiment, at least one of four types of standby words (A) to (D) below is recorded in the speech-recognition dictionary and grammar 114.

(A) System Grammar includes a set of standby words used for speech recognition of operation commands (that is, system commands) for operating the navigation system, such as "Yes", "No", "I come home", and "Cancel".

(B) Recognition-Target Phrases include standby words or phrases that include speech-recognition-target proper nouns such as a place name, a facility name and a street name.

(C) Keyword Grammar includes a set of words composed of syllables commonly contained in a plurality of recognition-target phrases, i.e., keywords that are acoustically common parts commonly contained in a plurality of recognition-target phrases, and garbage words used to absorb the remaining parts.

(D) Re-recognition Grammar is a set of standby words and phrases used for re-recognition of a recognition-target phrase that includes at least one keyword. The re-recognition grammar is used after speech recognition of a keyword using the keyword grammar described above for further speech recognition of a recognition-target phrase containing the recognized keyword.

The interpretation-result generator 115 generates an interpretation result based on the speech recognition result obtained by the speech recognition processor 113.

The response generator 116 generates a response message to be sent to the user and outputs the response message to the GUI display controller 117 and/or the speech synthesizer 118.

The GUI display controller 117 generates GUI data of the response message and outputs the GUI data to the monitor 150. The speech synthesizer 118 generates speech data of the response message and outputs the speech data via the loudspeaker 160.

The input controller 111, the speech buffer 112, the speech recognition processor 113, the speech-recognition dictionary and grammar 114, the interpretation-result generator 115, the response generator 116, the GUI display controller 117 and the speech synthesizer 118 repeat the above-described processing until a series of tasks on the navigation system, such as setting a destination and searching for facilities, is complete.

Figure 2:
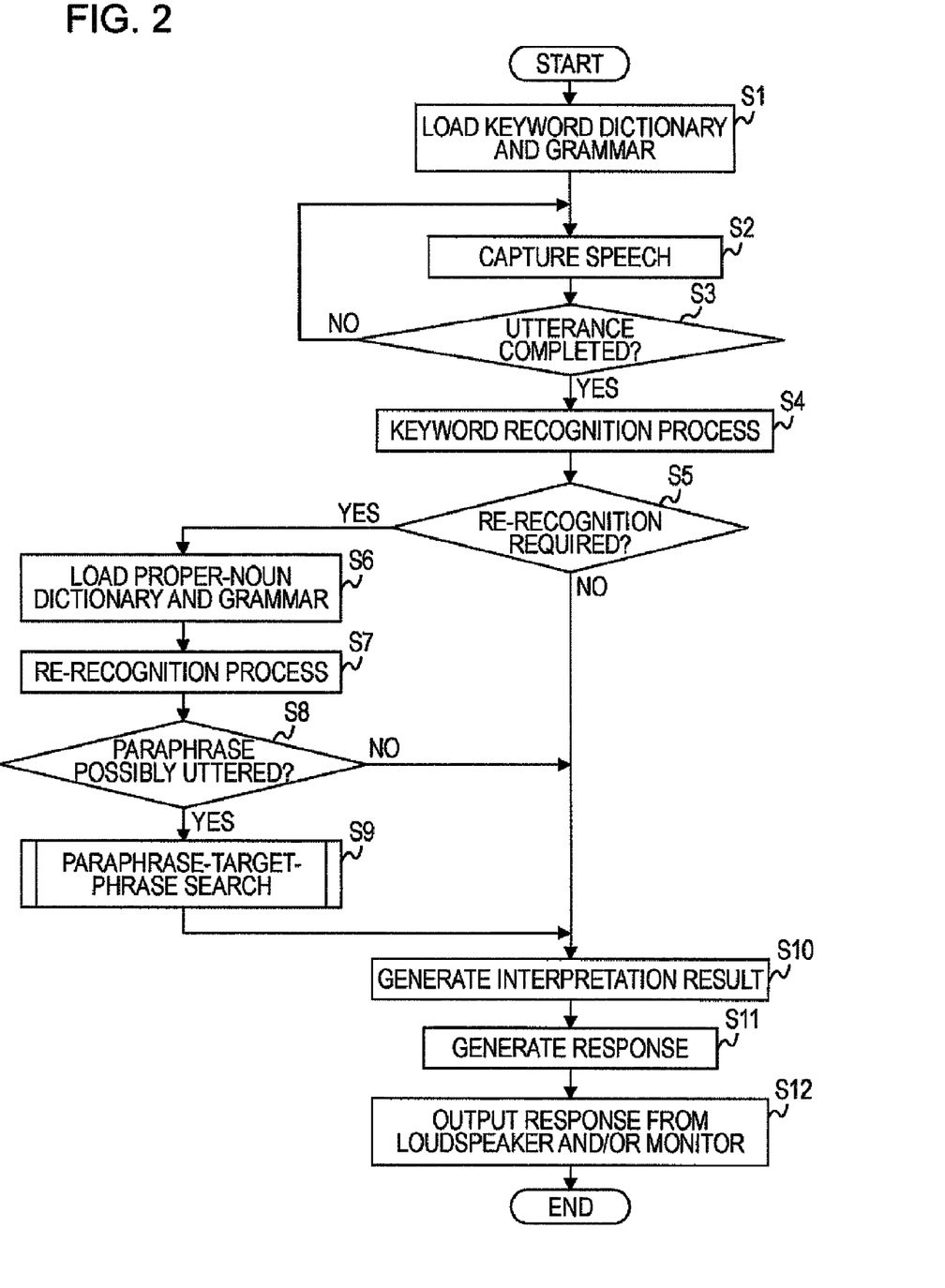
FIG. 2 is a flowchart showing a speech recognition process.

A speech recognition process performed by the control device 110 is next described with reference to a flowchart shown in FIG. 2. The process shown in FIG. 2 is performed by executing a program that is started when the user issues an instruction to start speech recognition by operating the speech-start switch 120.

In step S1 the control device 110 loads the keyword grammar described above from the disk 141 to the speech-recognition dictionary and grammar 114 via the disk reading device 140. Then, the process proceeds to step S2, where the input controller 111 starts the capture of speech input from the microphone 130 and stores speech data in the speech buffer 112.

The input controller 111 next determines whether or not the user has completed the utterance in step S3. For example, the input controller 111 monitors the input state of speech signals from the microphone 130 and determines that the utterance has been completed if no speech signals are input for a predetermined period of time. When it is determined that the utterance has been completed, the process proceeds to step S4.

In step S4 the speech recognition processor 113 performs a keyword recognition process using the keyword grammar described above. For example, as shown in FIG. 3A, the speech-recognition dictionary and grammar 114 has stored therein keyword grammar 201 including keywords "PARK", "CENTER" "ISOGO", "OFFICE" and "YOKOHAMA".

When the user utters "Isogo Ward Office", the speech recognition processor 113 performs speech recognition by matching the speech data of the speech uttered by the user with the keyword grammar 201. For example, the speech recognition processor 113 determines a recognition score indicating the acoustic similarity between the input speech data and each of the keywords included in the keyword grammar 201 and ranks the recognition results, e.g., in order from the recognition result with the highest score to the recognition result with the lowest score. Then, the speech recognition processor 113 determines the first-ranked recognition result as the recognition result of the keyword recognition process.

Figures 3A, 3B:
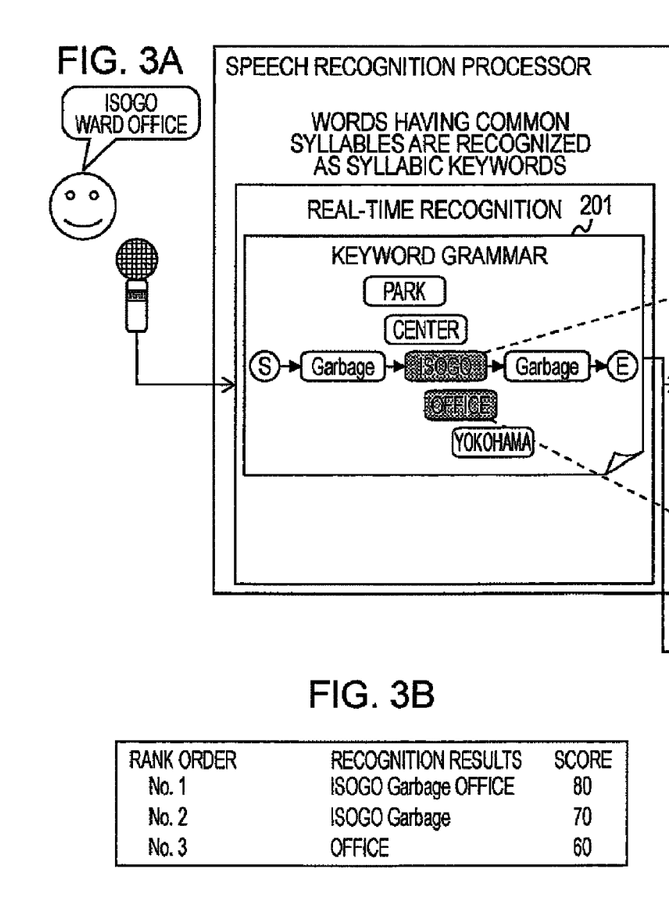
FIGS. 3A to 3C are diagrams schematically showing a specific example of the speech recognition process.

In this example, if the rank order of the recognition results is determined in the manner shown in FIG. 3B, the speech recognition processor 113 determines the first-ranked recognition result "ISOGO Garbage OFFICE" as the recognition result of the keyword recognition process.

Returning now to FIG. 2, the process next proceeds to step S5, in which the speech recognition processor 113 determines whether or not there is a need for re-recognition of the input speech data based on the recognition result of the keyword recognition process. That is, the speech recognition processor 113 determines whether or not re-recognition using the re-recognition grammar is required for the input speech data.

Specifically, if a recognition result is obtained in the keyword recognition process, the speech recognition processor 113 determines that re-recognition is required. If no recognition results are obtained in the keyword recognition process, the speech recognition processor 113 determines that no re-recognition is required.

If the speech recognition processor 113 determines that no re-recognition is required, the process proceeds to step S10, where the interpretation-result generator 115 generates an interpretation result indicating that no recognition results are obtained in the keyword recognition process and outputs the interpretation result to the response generator 116. Then, the process proceeds to step S11 as described below.

On the other hand, if the speech recognition processor 113 determines that re-recognition is required in step S5, the process proceeds to step S6. At step S6, the control device 110 loads recognition-target phrases that include the keywords recognized in the keyword recognition process as the re-recognition grammar from the disk 141 to the speech-recognition dictionary and grammar 114 via the disk reading device 140.

In the example shown in FIG. 3A, an "ISOGO" grammar 202 and an "OFFICE" grammar 203 are loaded as re-recognition grammar that includes the keywords (i.e., "ISOGO" and "OFFICE") contained in the recognition result "ISOGO Garbage OFFICE" from the keyword recognition process.

The "ISOGO" grammar 202 includes recognition-target phrases containing the keyword "ISOGO", e.g., facility names including "Isogo", such as "Isogo Police Office", "Isogo Ward Office of Yokohama City" and "Isogo Health Center".

The "OFFICE" grammar 203 includes recognition-target phrases containing the keyword "OFFICE", e.g., facility names including "Office", such as "Yokohama Municipal Office", "Isogo Ward Office of Yokohama City" and "Ise Municipal Office".

Referring again to FIG. 2, after this step S6, the process proceeds to step S7. In step S7 the speech recognition processor 113 re-recognizes the speech data stored in the speech buffer 112 using the "ISOGO" grammar 202 and the "OFFICE" grammar 203.

Specifically, the speech recognition processor 113 determines a recognition score obtained from the acoustic similarity between the speech data and each of standby words included in the "ISOGO" grammar 202 and the "OFFICE" grammar 203 indicating the recognition likelihood. The recognition results are then ranked, e.g., in order from the recognition result with the highest score to the recognition result with the lowest score.

Then, the speech recognition processor 113 determines the first-ranked recognition result as the recognition result of the re-recognition process.

Figure 3C:
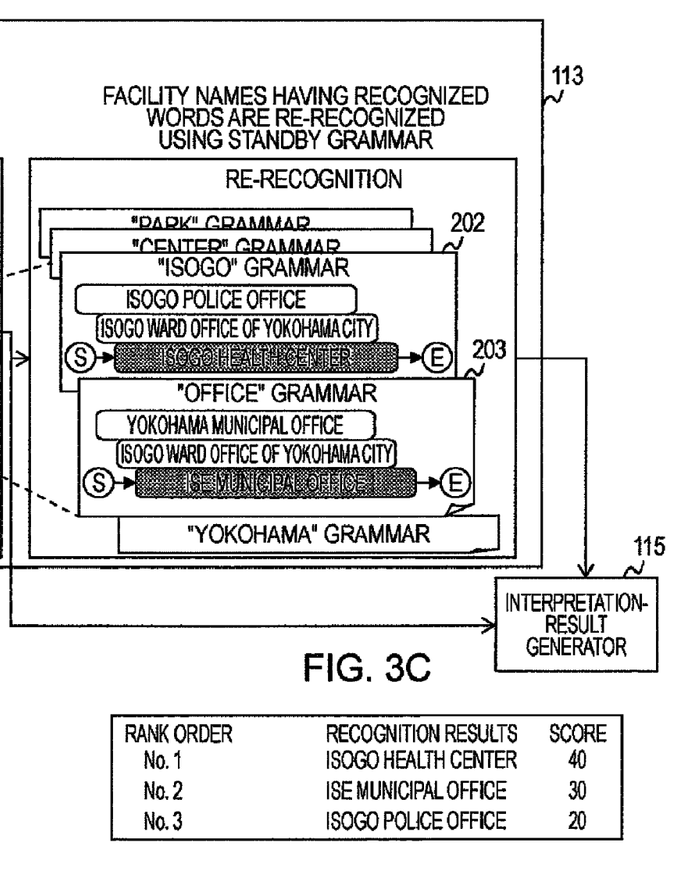

For example, if the rank order of the recognition results is as shown in FIG. 3C, the speech recognition processor 113 determines the first-ranked recognition result "Isogo Health Center" as the recognition result of the re-recognition process. The speech recognition processor 113 outputs both the recognition result of the keyword recognition process and the recognition score thereof and the recognition result of the re-recognition process and the recognition score thereof to the interpretation-result generator 115.

Returning again to FIG. 2, the process proceeds to step S8, where the interpretation-result generator 115 determines whether or not a paraphrase could have been uttered by the user based on the output results of the speech recognition processor 113.

A paraphrase is a phrase maintaining the same meaning as that of a certain recognition-target phrase although the phrases are acoustically different.

For example, in the example shown in FIG. 3A, the utterance "Isogo Ward Office" produced by the user is a paraphrase of "Isogo Ward Office of Yokohama City", which is included in the "ISOGO" grammar 202 and the "OFFICE" grammar 203.

In certain embodiments, if the recognition score of the recognition result of the re-recognition process is lower than the recognition score of the recognition result of the keyword recognition process by a predetermined value or more then the interpretation-result generator 115 determines that a paraphrase could have been uttered. For example, the interpretation-result generator 115 determines that a paraphrase could have been uttered if the recognition score of the recognition result of the re-recognition process is equal to or less than half of the recognition score of the recognition result of the keyword recognition process.

Returning again to the example in FIGS. 3B and 3C, the recognition score of the recognition result "Isogo Health Center" obtained in the re-recognition process is 40 shown in FIG. 3C, which is half the score (80) of the recognition result "ISOGO Garbage OFFICE" obtained in the keyword recognition process shown in FIG. 3B. In this case, the interpretation-result generator 115 determines that a paraphrase could have been uttered.

If the interpretation-result generator 115 determines that a paraphrase could not have been uttered in step S8 of FIG. 2, the process proceeds to step S10. In step S10 the interpretation-result generator 115 generates an interpretation result indicating the recognition result of the re-recognition process and outputs the interpretation result to the response generator 116. Then the process proceeds to step S11 as described below.

In contrast, if the interpretation-result generator 115 determines that a paraphrase could have been uttered in step S8, the process proceeds to step S9. In step S9 the interpretation-result generator 115 performs a paraphrase-target-phrase search process as described below with reference to FIG. 4. Then, the process proceeds to step S10, in which the interpretation-result generator 115 generates an interpretation result based on the result of the paraphrase-target-phrase search process as described below. The interpretation-result generator 115 outputs the generated interpretation result to the response generator 116, and the process proceeds to step S11.

In step S11 the response generator 116 generates a response message to respond to the user according to a predetermined rule based on the interpretation result output from the interpretation-result generator 115 in step S10. The response generator 116 outputs data of the generated response message to the GUI display controller 117 and the speech synthesizer 118.

In step S12 the GUT display controller 117 generates GUI data of the response message based on the data generated in step S11 and outputs the GUI data to the monitor 150. Similarly, the speech synthesizer 118 generates speech data of the response message based on the data generated in step S11 and outputs the speech data via the loudspeaker 160. After step S12, the process ends.

Next, the paraphrase-target-phrase search process performed in step S9 is described with reference to FIG. 4.

Figure 4:
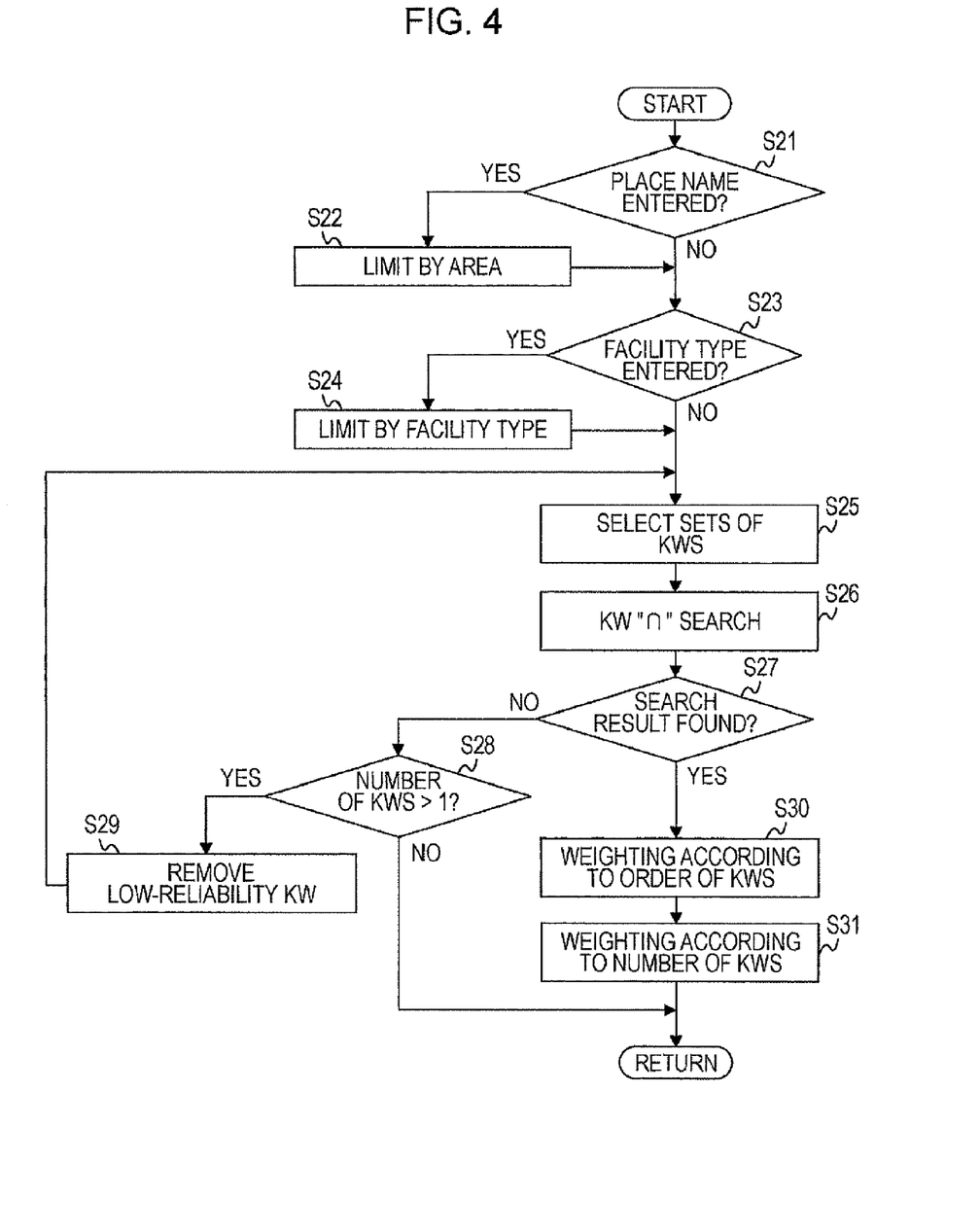
FIG. 4 is a flowchart showing a paraphrase-target-phrase search process.

FIG. 4 is a flowchart showing an example of a process for determining which of the recognition-target facility names the user paraphrased from among standby facility names used as the re-recognition grammar. Facility names are used by example herein; if the standby words in the re-recognition grammar do not indicate facility names, other standby words are targeted to perform the process shown in FIG. 4.

In the process shown in FIG. 4, a search query is first performed in steps S21 to S25 to generate candidate facility names (recognition-target phrases) that are possibly paraphrased from the speech-recognition dictionary and grammar 114.

Specifically, in step S21, the interpretation-result generator 115 determines whether or not the user has already uttered and specified a place name prior to the current utterance. If a place name has already been specified, the process proceeds to step S22, in which a condition for limiting facility names to be extracted by the area designated by the specified place name is added to the search query.

Then, the interpretation-result generator 115 determines whether or not the user has already uttered and specified a facility type prior to the current utterance in step S23. If a facility type has already been specified, the process proceeds to step S24, in which a condition for limiting facility names to be extracted by the specified facility type is added to the search query. Then, the process proceeds to step S25.

In step S25 the interpretation-result generator 115 selects sets of keywords (KW) to be searched from a keyword group recognized in the keyword recognition process, hereinafter referred to as a "recognition keyword group." For example, in the case of the recognition result "ISOGO Garbage OFFICE" obtained in the keyword recognition process, two keywords "ISOGO" and "OFFICE" are selected.

Basically, sets of keywords for searching for recognition-target phrases associated with the recognition keyword group are selected. That is, sets of keywords for searching for recognition-target phrases associated with all keywords included in the recognition keyword group are selected. However, if the keywords contained in the recognition keyword group include a set of keywords between which a semantic conflict is caused, sets of keywords are selected so that the keywords between which the conflict is caused are not included in the same set.

For example, if two completely different place names are recognized, the two place names are not included in the same set of keywords. Specifically, it is assumed that keywords indicating place names, e.g., "TOKYO" and "KYOTO", and the keyword "LIBRARY" are recognized in one utterance. In this case, since no place name including both "Tokyo" and "Kyoto" generally exists, the keywords "TOKYO" and "KYOTO" are not included in the same set.

Accordingly, the interpretation-result generator 115 selects two sets of words. The first is the set of keywords "TOKYO" and "LIBRARY", where the keyword "KYOTO"

is removed from the recognition keyword group. The second is the set of keywords "KYOTO" and "LIBRARY", where the keyword "TOKYO" is removed from the recognition keyword group.

In some cases, the user may utter a place name in front of a facility name to limit facilities. Therefore, when the keywords "KYOTO" and "LIBRARY" are recognized, a paraphrase of a phrase containing the two keywords "KYOTO" and "LIBRARY", or a paraphrase of a "LIBRARY" located in Kyoto City could have been uttered.

Thus, the interpretation-result generator 115 adds a search condition for each of the selected sets of keywords to the search query generated in steps S21 to S24 to generate a search query in step S26. A specific example of the search query is described below with reference to FIG. 5.

Also in step S26, the interpretation-result generator 115 searches the recognition-target phrases recorded in the speech-recognition dictionary and grammar 114 using the generated search query. The recognition-target phrases are loaded in advance from the disk 141 to the speech-recognition dictionary and grammar 114.

Then, the process proceeds to step S27. In step S27 the interpretation-result generator 115 determines whether or not a recognition-target phrase has been extracted as a result of the search performed in step S26. If no recognition-target phrases have been extracted, the process proceeds to step S28, in which the interpretation-result generator 115 determines the number of keywords contained in the recognition keyword group.

If the number of keywords is two or more in step S28, the process proceeds to step S29, where the interpretation-result generator 115 calculates recognition reliabilities of the keywords and removes a low-reliability keyword or keywords from the recognition keyword group. For example, all keywords having a reliability not higher than a predetermined value may be removed, or one keyword having the minimum reliability may be removed. The calculation of reliabilities is known in the art and is disclosed in, for example, Japanese Unexamined Patent Application Publication No. 2001-034292. A detailed description thereof is thus omitted.

After step S29, the process returns to step S25. Therein, sets of keywords are selected again from the recognition keyword group from which the low-reliability keyword(s) are removed.

If the interpretation-result generator 115 determines in step S28 that the number of keywords is less than or equal to one, the process returns that shown in FIG. 2. In this case, in step S11 shown in FIG. 2, the interpretation-result generator 115 determines that no paraphrase was uttered by the user and outputs the recognition result of the keyword recognition process to the response generator 116.

Returning again to FIG. 4, if the interpretation-result generator 115 determines in step S27 that a recognition-target phrase has been extracted, all extracted recognition-target phrases are set as paraphrase-target phrases. Paraphrase-target phrases are recognition-target phrases corresponding to the paraphrase that could have been uttered by the user. The process proceeds to step S30.

In step S30, the interpretation-result generator 115 compares, for each paraphrase-target phrase, the order of appearance of the keywords contained in the recognition keyword group and the order of appearance of the keywords in a keyword group (hereinafter referred to as a "candidate keyword group") contained in the paraphrase-target phrase. For example, in the case of "ISOGO Garbage OFFICE", the keyword "ISOGO" appears first and the keyword "OFFICE" appears second.

Then, the interpretation-result generator 115 applies weighting to the paraphrase-target phrases so that the more similar to the order of appearance of a given keyword of the keywords included in each of the recognition keyword group and the candidate keyword group, the larger the weighting factor. That is, the interpretation-result generator 115 performs weighting so that a large weighting factor is assigned to a paraphrase-target phrase containing keywords appearing in an order similar to the order of appearance of the keywords included in the recognition keyword group.

Then, the process proceeds to step S31. The interpretation-result generator 115 applies weighting to the paraphrase-target phrases so that the closer to the number of keywords included in the recognition keyword group is to the number of keywords included in the candidate keyword group, the larger the weighting factor.

A specific example of the weighting procedures in steps S30 and S31 is described below with reference to FIG. 5.

After step S31, the process returns to the process shown in FIG. 2. In step S50, the interpretation-result generator 115 generates an interpretation result indicating the paraphrase-target phrase with the largest weighting factor and outputs the interpretation result to the response generator 116.

Therefore, a recognition-target phrase (i.e., paraphrase-target phrase) corresponding to the paraphrase uttered by the user can be specified. In other words, the interpretation-result generator 115 determines that the user uttered a paraphrase of the paraphrase-target phrase with the largest weighting factor.

Figure 5:
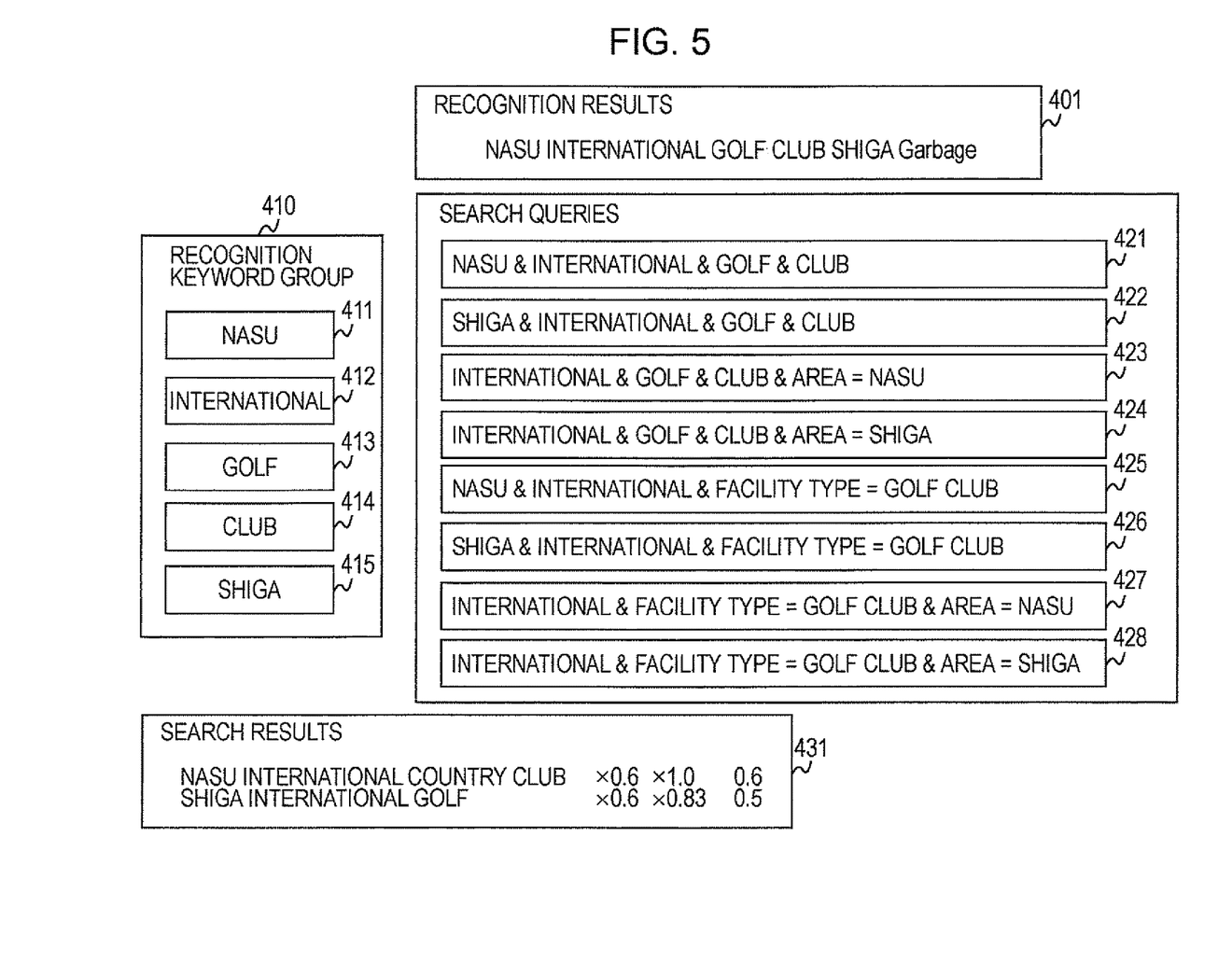
FIG. 5 is a diagram schematically showing a specific example of the paraphrase-target-phrase search process.

FIG. 5 is a diagram schematically showing a specific example of the paraphrase-target-phrase search process. In the example shown in FIG. 5, the user uttered "Nasu International Golf Club" as a paraphrase of the facility name "Nasu International Country Club".

In this case, "NASU, INTERNATIONAL, GOLF, CLUB, SHIGA, Garbage" is obtained as a recognition result 401 of the keyword recognition process. That is, the recognition result 401 of the keyword recognition process includes a recognition keyword group 410 including keywords "NASU" 411, "INTERNATIONAL" 412, "GOLF" 413, "CLUB" 414 and "SHIGA" 415.

In the recognition result 401, "SHIGA" is added to the end of the utterance due to erroneous recognition as "SHIGA" was not uttered by the user. If a short keyword such as "SHIGA" is recorded as a standby word in the keyword grammar 201, noise can be erroneously recognized as such a short keyword.

In the flowchart shown in FIG. 4, in steps S21 to S24, if the user has uttered a place name or a facility type prior to the current utterance, search queries are additionally generated accordingly. However, it is assumed here that, for simplification of illustration, such utterances have not existed before. In step S25 the interpretation-result generator 115 selects sets of keywords for searching for paraphrase-target phrases from the recognition keyword group. In step S26 the interpretation-result generator 115 generates search queries 421 to 428 corresponding to the sets of keywords. The search queries 421 to 428 are now described.

As previously mentioned, basically, sets of keywords for searching for recognition-target phrases associated with all keywords included in the recognition keyword group are selected to generate search queries. In the example shown in FIG. 5, however, the keywords "NASU" 411 and "SHIGA" 415 included in the recognition keyword group 410 represent geographical conditions and conflict with each other. Therefore, either keyword is used in one search query.

That is, a first set of keywords, except for the keyword "SHIGA" 415, is selected from the recognition keyword group 410 to generate the search query 421, and a second set of keywords, except for the keyword "NASU" 411, is selected from the recognition keyword group 410 to generate the search query 422.

Since the keywords "NASU" 411 and "SHIGA" 415 are place names, those keywords can be attributive modifiers of the name of the facility rather than keywords contained in the name of the facility. Therefore, the search queries 423 and 424 are generated in which those keywords are used as attributive modifiers for areas where facilities are located.

In other words, the search query 421 is used to search for the facility name containing four keywords: "NASU", "INTERNATIONAL", "GOLF" and "CLUB". The search query 423 is used to search for the name of the facility located in the "Nasu" area and containing three keywords: "INTERNATIONAL", "GOLF" and "CLUB".

Further, the phrase "golf club" composed of "Golf" and "Club" is a keyword indicating a facility type. Thus, those keywords can be attributive modifiers of the name of the facility rather than keywords contained in the name of the facility. Therefore, the search queries 425 and 426 are generated in which the keywords "GOLF" and "CLUB" are used an attributive modifier for the type of the facility "golf club". Similarly, the search queries 427 and 428 are generated in which both areas and facility types are used as attributive modifiers.

As a result of the search performed in step S26 of FIG. 4 using the search queries 421 to 428 described above, a search result 431 is obtained. In the search result 431, two recognition-target phrases, "Nasu International Country Club" and "Shiga International Golf", are extracted as paraphrase-target phrases.

The interpretation-result generator 115 applies weighting to the two paraphrase-target phrases in steps S30 and S31 of FIG. 4. First, in step S30, the interpretation-result generator 115 performs weighting according to the order of appearance of the keywords.

Specifically, the order of appearance of the keywords in the first paraphrase-target phrase "Nasu International Country Club" is "NASU, INTERNATIONAL and CLUB", and matches the order of appearance of the keywords "NASU" 411, "INTERNATIONAL" 412 and "CLUB" 414 in the recognition keyword group 410. Such keywords appearing in an order that matches the order of appearance of the keywords in the recognition keyword group are assigned a weighting factor of 1 here.

On the other hand, the order of appearance of the keywords in the second paraphrase-target phrase "Shiga International Golf" is "SHIGA, INTERNATIONAL and GOLF", and the position at which the keyword "SHIGA" appears is different from that in the order of appearance of the keywords "INTERNATIONAL" 412, "GOLF" 413 and "SHIGA" 411 in the recognition keyword group 410. Such keywords appearing in an order that does not match the order of appearance of the keywords in the recognition keyword group are assigned a weighting factor of ½ in this example.

In this embodiment, the interpretation-result generator 115 determines an average value of the weighting factors assigned to the keywords contained in each of the paraphrase-target phrases as the weighting factor of the paraphrase-target phrase in step S30. That is, in step S30, the weighting factors of the paraphrase-target phrases are determined by equations (1) and (2) as follows:

$$\text{Weighting factor of "Nasu International Country Club"} = \quad (1)$$
$$(\text{weighting factor of "NASU"} +$$
$$\text{weighting factor of "INTERNATIONAL"} +$$
$$\text{weighting factor of "CLUB"}) \times \frac{1}{3} = (1 + 1 + 1) \times \frac{1}{3} = 1;$$

and $$\text{Weighting factor of "Shiga International Golf"} = \quad (2)$$
$$(\text{weighting factor of "SHIGA"} +$$
$$\text{weighting factor of "INTERNATIONAL"} +$$
$$\text{weighting factor of "GOLF"}) \times \frac{1}{3} =$$
$$\left(\frac{1}{2} + 1 + 1\right) \times \frac{1}{3} = \frac{5}{6} \approx 0.83.$$

In step S31 the interpretation-result generator 115 further determines the ratio of the number of keywords contained in each of the paraphrase-target phrases relative to the number of keywords contained in the recognition keyword group 410 as the weighting factor of the paraphrase-target phrase.

That is, the number of keywords contained in the recognition keyword group 410 is five, and three keywords are contained in each of the paraphrase-target phrases "Nasu International Country Club (NASU, INTERNATIONAL and CLUB)" and "Shiga International Golf (SHIGA, INTERNATIONAL and GOLF)". Thus, the weighting factor of each of those paraphrase-target phrases is equal to 3/5 (i.e., 0.6).

Then, in step S10 shown in FIG. 2, the interpretation-result generator 115 multiplies the weighting factor determined in step S30 by the weighting factor determined in step S31 to calculate a weighting factor used for decision making and generates an interpretation result indicating the paraphrase-target phrase with a larger decision-making weighting factor.

For example, in the search result 431 shown in FIG. 5, the decision-making weighting factors of those paraphrase-target phrases are determined by equations (3) and (4) as follows:

Decision-making weighting factor of "Nasu International Country Club"=1×0.6=0.6;and (3)

Decision-making weighting factor of "Shiga International Golf"=0.83×0.6≈0.5. (4)

In the example shown in FIG. 5, the interpretation-result generator 115 generates an interpretation result indicating the paraphrase-target phrase "Nasu International Country Club" and outputs the interpretation result to the response generator 116 based on the output of equations (3) and (4).

That is, the interpretation-result generator 115 determines the speech recognition result of the speech utterance to be the recognition-target phrase "Nasu International Country Club" corresponding to the paraphrase "Nasu International Golf Club" uttered by the user.

Therefore, even if a user utters a paraphrase, a recognition-target phrase corresponding to the paraphrase can be correctly recognized as the recognition result of the speech utterance.

The embodiments described above can achieve several advantages as follows.

First, it is determined whether or not a paraphrase of a recognition-target phrase has been uttered by a user based on a recognition result of the keyword recognition process and a recognition result of the re-recognition process. If it is determined that a paraphrase has been uttered, a recognition-target phrase corresponding to the paraphrase is determined as the speech recognition result of the speech utterance based on keywords recognized in the keyword recognition process. Therefore, correct speech recognition can be achieved even if a user utters a paraphrase.

Second, it is determined whether or not re-recognition of a speech utterance is required based on a recognition result of the keyword recognition process. If re-recognition is required, a re-recognition process is performed using a recognition-target phrase including a recognized keyword as a standby phrase. Therefore, the number of chosen standby words required for the re-recognition process can be reduced according to the result of the keyword recognition process, and the memory capacity for recording the standby words can be reduced.

Third, a keyword composed of syllables commonly contained in a plurality of recognition-target phrases is used in an embodiment. Therefore, even a phrase containing no semantic keywords, or a phrase in which a semantic keyword composed of syllables and an actual recognition-target phrase do not coincide with each other, can provide matching between the keyword and the recognition-target phrase.

Fourth, it is determined that a paraphrase has been uttered if a recognition score obtained as a recognition result in the re-recognition process is lower than a recognition result obtained as a recognition result in the keyword recognition process by a predetermined value or more. Therefore, even if a speaker does not accurately utter a recognition-target phrase, the utterance of a paraphrase can be detected as long as a keyword is contained in the utterance.

Fifth, if a plurality of keywords are recognized as a recognition keyword group from a speech utterance, a recognition-target phrase associated with the recognition keyword group, i.e., a recognition-target phrase associated with all the plurality of keywords, is specified as a recognition-target phrase corresponding to a paraphrase uttered by a user. Therefore, even if a plurality of recognition-target phrases associated with each keyword exist, only a recognition-target phrase associated with all keywords is targeted, and the set of possible recognition-target phrases can be limited.

Sixth, when a plurality of keywords is recognized from a speech utterance in the keyword recognition process, if the plurality of keywords includes a set of keywords between which a semantic conflict is caused, all the set of keywords, except for one keyword, are removed. Then, a recognition-target phrase associated with the keyword group after the removal, i.e., a recognition-target phrase associated with all the keywords that remain after the removal, is specified as a recognition-target phrase corresponding to the paraphrase uttered by the user. Therefore, keywords that are possibly erroneously detected are removed, and speech recognition less affected by the erroneously detected keywords can be achieved.

Seventh, if a plurality of recognition-target phrases corresponding to a paraphrase is specified, weighting is performed so that a large weighting factor is assigned to a recognition-target phrase containing keywords appearing in an order similar to the order of appearance of keywords contained in the speech utterance. Further, weighing is performed so that a large weighting factor is assigned to a recognition-target phrase having a high ratio of the number of keywords contained in the recognition-target phrase corresponding to the paraphrase relative to the number of keywords contained in the recognition keyword group. Then, the resulting weighting factors are multiplied to specify one recognition-target phrase as the recognition-target phrase corresponding to the paraphrase. Therefore, a recognition-target phrase corresponding to a paraphrase uttered by a user can be specified with high accuracy.

Eighth, if a recognition-target phrase associated with all the plurality of keywords is not successfully extracted, at least one keyword is removed from the plurality of keywords, and recognition-target phrases associated with all the remaining keywords are specified as recognition-target phrases corresponding to a paraphrase uttered by the user. Therefore, if no recognition-target phrases associated with all keywords exist, the number of keywords can be reduced to increase the number of target recognition-target phrases.

Ninth, recognition reliabilities of keywords can be determined and at least one keyword with low recognition reliability is correspondingly removed. Therefore, a keyword that is possibly erroneously detected is removed, and speech recognition less affected by the erroneously detected keyword can be achieved.

The speech recognition apparatus according to the embodiment described above can be modified in several ways.

For example, in the description above, the speech recognition apparatus 100 is mounted in a navigation system by way example. However, the speech recognition apparatus 100 may be mounted in any other apparatus configured to perform speech recognition upon the receipt of an utterance produced by a user. For example, the speech recognition apparatus 100 may be mounted in an audio system that can be operated by speech.

Further, in the foregoing embodiments, a keyword included in the keyword grammar is implemented by syllables commonly contained in a plurality of recognition-target phrases, i.e., a syllabic keyword, by way of example. However, the keyword can be implemented by a characteristic word indicating a recognition-target phrase. The keyword can be implemented by, for example, a characteristic word used to limit facilities, such as a place name or a genre name. Therefore, even if a user erroneously utters a phrase semantically similar to a recognition-target phrase, matching between keywords and the recognition-target phrase can be performed.

The speech recognition processor 113 described above performs a keyword recognition process and then performs a re-recognition process using, as the re-recognition grammar, recognition-target phrases that include a recognized keyword. However, when the number of recognition-target phrases is small, all the recognition-target phrases may be loaded in advance into the speech-recognition dictionary and grammar 114, and a recognition process may be performed on all the recognition-target phrases in parallel to the keyword recognition process based on the keyword grammar 201.

By performing the processes in parallel, the time required for the processes can be reduced. In this case, a recognition score obtained as a result of the keyword recognition process and a recognition score obtained as a result of the recognition process performed on all the recognition-target phrases may be compared to determine whether or not a paraphrase could have been uttered.

The interpretation-result generator 115 described above determines that a paraphrase could have been uttered if the recognition score of the recognition result of the re-recognition process is lower than the recognition score of the recognition result of the keyword recognition process by a predetermined value or more, by way of example. However, if the recognition score of the recognition result of the re-recognition process does not exceed a predetermined threshold value, it may be determined that a paraphrase could have been uttered regardless of the recognition score of the recognition result of the keyword recognition process. Accordingly, it can be determined with accuracy whether a paraphrase could have been uttered.

If a plurality of recognition-target phrases corresponding to a paraphrase are specified in the embodiments described above, the interpretation-result generator 115 performs weighting based on the order of appearance of keywords in step S30 and performs weighting based on the number of keywords in step S31 as shown in FIG. 4. Then, the weighting factor determined in step S30 is multiplied by the weighting factor determined in step S31 to specify one recognition-target phrase corresponding to the paraphrase. However, only one of the weighting processing of step S30 or the weighting processing of step S31 may be performed, and one recognition-target phrase corresponding to the paraphrase may be specified based on the weighting factor determined in the one weighting processing.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A speech recognition apparatus, comprising:
   a speech input unit configured to capture a speech utterance; and
   a control device configured to receive and store the speech utterance from the speech input unit comprising:
      a recognition unit configured to compare the speech utterance against keywords which are stored in the control device and determine a recognition result and configured to recognize a plurality of keywords contained in a speech utterance as a keyword group, and based on the first recognition result, further configured to re-recognize a keyword contained in the speech utterance using a phrase containing the keyword and determine a re-recognition result; and
      an interpretation-results generator configured to determine whether a paraphrase could have been uttered based on the recognition result and the re-recognition result obtained by the recognition unit and configured to specify a phrase corresponding to the paraphrase based on the keyword recognized by the recognition unit when the interpretation-results generator determines that the paraphrase could have been uttered,
      the interpretation-results generator further configured to specify a phrase associated with the keyword group as a phrase corresponding to the paraphrase, to remove at least one keyword from the keyword group and to specify a phrase associated with the keyword group from which the at least one keyword is removed as the phrase corresponding to the paraphrase when the interpretation-results generator does not successfully extract the phrase associated with the keyword group as originally constituted.

2. The speech recognition apparatus according to claim 1 wherein the interpretation-results generator is configured to determine that the paraphrase could have been uttered when a recognition score based on then recognition result is higher than a recognition score based on the re-recognition result by a predetermined value or more.

3. The speech recognition apparatus according to claim 1 wherein the interpretation-results generator is configured to determine that the paraphrase could have been uttered when a recognition score based on the re-recognition result does not exceed a predetermined threshold value.

4. The speech recognition apparatus according to claim 1 wherein:
   the recognition unit is configured to recognize a plurality of keywords; and
   the interpretation-results generator is further configured to remove a keyword in semantic conflict with another of the plurality of keywords and to specify a phrase associated with the remaining keywords as a phrase corresponding to the paraphrase.

5. The speech recognition apparatus according to claim 1 wherein the interpretation-results generator is configured to specify the phrase associated with the keyword group based on the order in which the keywords were uttered.

6. The speech recognition apparatus according to claim 1 wherein the interpretation-results generator is configured to specify the phrase associated with the keyword group based on the number of keywords contained in the phrase relative to the number of keywords contained in the keyword group.

7. The speech recognition apparatus according to claim 1 wherein the interpretation-results generator is further configured to determine a recognition reliability of each of the keywords contained in the keyword group and to remove the at least one keyword based on low recognition reliability.

8. The speech recognition apparatus according to claim 1 wherein the recognition unit is configured to perform respective recognition and re-recognition processes in parallel.

9. The speech recognition apparatus according to claim 1 wherein the keyword comprises syllables commonly contained in a plurality of phrases containing the keyword.

10. The speech recognition apparatus according to claim 1 wherein the keyword comprises an acoustically common part contained in a plurality of phrases containing the keyword.

11. The speech recognition apparatus according to claim 1 wherein the keyword comprises a characteristic word indicating a plurality of phrases containing the keyword.

12. The speech recognition apparatus according to claim 1 wherein the phrase containing the keyword comprises a standby proper-noun word including at least one of a place name, a facility name and a street name.

13. The speech recognition apparatus according to claim 1 wherein the paraphrase comprises a word having a same meaning as the phrase containing the keyword that is acoustically different from the phrase containing the keyword.

14. A speech recognition apparatus comprising:
   means for inputting a speech utterance;
   means for recognizing any keywords contained in the speech utterance and a plurality of keywords contained in a speech utterance as a keyword group;
   means for re-recognizing the keyword contained in the speech utterance using a phrase containing the keyword;
   means for determining whether a paraphrase could have been uttered based on a recognition result obtained by the recognition means and a recognition result obtained by the re-recognition means;
   means for specifying a phrase corresponding to the paraphrase based on the keyword recognized by the recognition means when the paraphrase could have been uttered; and
   means for specifying a phrase associated with the keyword group as a phrase corresponding to the paraphrase, removing at least one keyword from the keyword group and specifying a phrase associated with the keyword group from which the at least one keyword is removed as the phrase corresponding to the paraphrase when the interpretation-results generator does not successfully extract the phrase associated with the keyword group as originally constituted.

15. A speech recognition method carried out by a control device comprising:
- comparing a speech utterance captured by a speech input unit to a speech-recognition dictionary saved in the control device;
- recognizing a keyword contained in the speech utterance, a phrase containing the keyword and a plurality of keywords contained in a speech utterance as a keyword group;
- determining whether a paraphrase, different from the speech utterance, could have been uttered based on both recognition results;
- when it is determined that the paraphrase could have been uttered, determining an intended phrase corresponding to the paraphrase based on the keyword; and
- specifying a phrase associated with the keywords in the keyword group as the phrase corresponding to the paraphrase; and
- removing at least one keyword from the keyword group when no phrase is associated with all the keywords in the keyword group.

16. The speech recognition method of claim 15, further comprising:
- determining the reliability of each keyword in the keyword group; and
- removing at least one keyword with a low recognition reliability from the keyword group when no phrase is associated with all the keywords in the keyword group.

* * * * *